(No Model.)

C. R. JENNE.
LAMP SKETCHING CAMERA.

No. 520,058. Patented May 22, 1894.

WITNESSES:
W. H. Crighton
A. L. King

Chaney R. Jenne INVENTOR

BY Chapin & Denny his ATTORNEYS.

UNITED STATES PATENT OFFICE.

CHANCY R. JENNE, OF FORT WAYNE, INDIANA.

LAMP SKETCHING-CAMERA.

SPECIFICATION forming part of Letters Patent No. 520,058, dated May 22, 1894.

Application filed March 16, 1893. Serial No. 466,287. (No model.)

*To all whom it may concern:*

Be it known that I, CHANCY R. JENNE, a citizen of the United States, residing at Fort Wayne, in the county of Allen, in the State of Indiana, have invented certain new and useful Improvements in Lamp Sketching-Cameras; and I do hereby declare that the following is a full, clear, and exact description of the invention, which will enable others skilled in the art to which it appertains to make and use the same, reference being had to the accompanying drawings, which form part of this specification.

In a certain patent issued to me November 24, 1891, No. 463,630, I have described an apparatus for enlarging pictures from a photograph or other study, and the present invention relates to certain improvements in the apparatus described in said patent.

The object of my invention is to provide a lamp sketching camera designed and adapted for enlarging a small picture or photograph to any desired size by the use of artificial light and without the use of either negatives or chemicals.

My invention consists in the novel construction and combination of the several parts, as will be hereinafter set forth, and particularly pointed out in the claim.

The object of my invention thus indicated is accomplished by the means illustrated in the accompanying drawings forming part of this specification in which similar letters of reference indicate corresponding parts in the several views.

Figure 1:
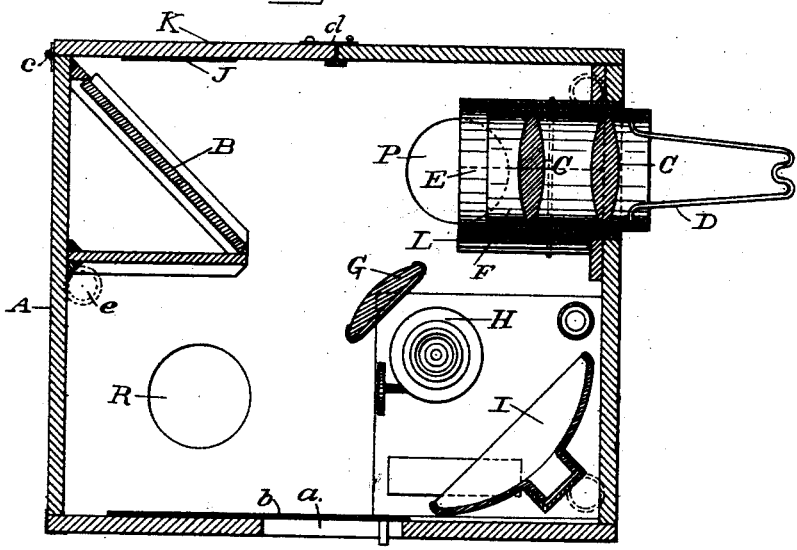
Figure 2:
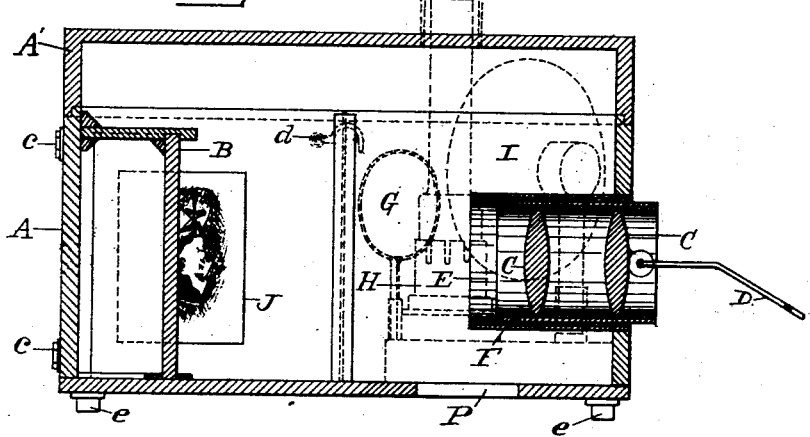

Referring now to the drawings, Figures 1 is a horizontal section of my invention arranged in position for use with a lamp or other artificial light. Fig. 2 is a vertical section of the same through the lenses C, C.

The camera box A, of any suitable material, preferably of wood and of a rectangular form and of any proper size, is provided with a lid A' having a suitable perforation in which the metallic chimney or elbow *f* may be adjustably secured, to conduct the heat of the lamp H when in use, out of the camera and away from the operator. The box A is also provided with a suitable number of feet *e* and proper perforations P and R in the bottom thereof, to afford the necessary ventilation for the flame of said lamp, and with an opening *a* in one side thereof through which the operator may insert his hand to regulate the flame of the lamp H or to adjust the mirror I and the condensing lens G as seen in Fig. 1. The said opening *a* is closed at pleasure by a tin or other slide *b* adjustably secured to the inside of the said box. In the opposite side of said box is arranged a door K having hinges *c, c,* and a latch *d* for securing the same.

Upon the inner surface of the door K is properly secured the picture or photograph J to be enlarged, by artificial light.

In one end of the box A and opposite to the picture J is placed or rigidly secured in any proper manner the mirror B inclined to said picture at an angle of about forty-five degrees, while the other end of the box A is provided with a circular perforation in which the tube E is rigidly secured. In this tube E is placed the tube F adjustable therein, and having the lenses C, C, and the bail D for securing the desired focus.

The lamp H, which is of any proper form or construction is provided with a suitable concave reflector I so placed in relation to the flame as to throw the light of the lamp full upon the picture J, and also with a condensing lens G placed between the said lamp and the picture to be enlarged. When the lamp H is used with my invention, I provide a shield L, preferably made of corrugated paper or other suitable material, and mounted upon the lens tube E in such a manner as to shield the said tube from the heat of the lamp and thereby prevent the accumulation of moisture upon the inside of the outer lens. This shield is detachably mounted and can thus be readily adjusted in position for use or removed therefrom when not needed.

An extension chimney, preferably about four inches in length, may be used, which will materially improve the flame and prevent it from smoking when in use.

The camera box A is placed upon a table of proper height, the lamp H being in position therein with the reflector I and the condensing lens G properly placed as before described, and with the chimney thereof protruding through the cover A', as seen in Figs. 1 and 2.

Instead of a kerosene lamp, an incandescent electric lamp may be conveniently used, and when artificial light of any description is employed the shield L should be adjusted upon the tube E to prevent the condensation of moisture upon the inner surface of the outer lens as described. With the artificial light thus arranged the reflected and enlarged image will be thrown full and clear upon the easel as in the case of the use of solar light.

Having thus described my invention, what I claim as new and useful, and desire to secure by Letters Patent, is—

In a sketching camera, the combination of the box A having a lid A', feet e, a hinged door K adapted to secure the picture J, an opening a, a slide b for closing the same, and suitable perforations in the bottom thereof for ventilation, a lens tube E rigidly secured in the end of said box and provided with a heat shield L, with a mirror B inclined to the door K, a tube adjustably mounted in the tube E and provided with the enlarging lens C, C, and the focusing bail D, and a lamp H provided with a concave reflector I and a condensing lens G mounted thereon, all substantially as set forth and described.

Signed by me, at Fort Wayne, Indiana, this 14th day of March, 1893.

CHANCY R. JENNE.

Witnesses:
  C. J. McLAIN,
  EMMELL V. HARRIS.